United States Patent
Ivory et al.

(10) Patent No.: US 7,303,112 B2
(45) Date of Patent: Dec. 4, 2007

(54) REPAIR OF BRAZE JOINT AND ARTICLE REPAIRED

(75) Inventors: Steven Ivory, Manchester, CT (US); Jose A. Echevarria, East Hartford, CT (US); Gary M. Lomasney, Glastonbury, CT (US); David R. Malley, Bolton, CT (US); Kevin C. McMahon, Vernon, CT (US); James J. Moor, Torrington, CT (US); Joseph Rokicki, Bolton, CT (US)

(73) Assignee: United Technologies Corporation, Hartford, CT (US)

( * ) Notice: Subject to any disclaimer, the term of this patent is extended or adjusted under 35 U.S.C. 154(b) by 337 days.

(21) Appl. No.: 10/977,853

(22) Filed: Oct. 29, 2004

(65) Prior Publication Data

US 2006/0091182 A1    May 4, 2006

(51) Int. Cl.
*B23K 31/00* (2006.01)
*B23K 1/018* (2006.01)
*B23P 6/00* (2006.01)

(52) U.S. Cl. .................. 228/119; 191/202; 29/889.1
(58) Field of Classification Search ............ None
See application file for complete search history.

(56) References Cited

U.S. PATENT DOCUMENTS

| | | | |
|---|---|---|---|
| 4,141,124 A * | 2/1979 | Ryan .................. 29/889.1 |
| 4,317,685 A * | 3/1982 | Ahuja et al. ............ 134/2 |
| 4,842,663 A * | 6/1989 | Kramer .................. 156/98 |
| 5,437,737 A | 8/1995 | Draghi et al. |
| 5,512,201 A | 4/1996 | Singh et al. |
| 5,598,968 A | 2/1997 | Schaeffer et al. |
| 5,755,030 A * | 5/1998 | Fraser .................. 29/889.1 |
| 5,944,909 A * | 8/1999 | Reeves et al. ............ 134/3 |
| 5,994,666 A * | 11/1999 | Buldhaupt et al. ...... 219/121.64 |
| 6,042,879 A * | 3/2000 | Draghi et al. ............ 427/142 |
| 6,159,545 A | 12/2000 | Malone et al. |
| 6,173,491 B1 * | 1/2001 | Goodwater et al. ........ 29/889.1 |

(Continued)

FOREIGN PATENT DOCUMENTS

EP    1 148 208    10/2001

(Continued)

OTHER PUBLICATIONS

European Search Report, Mar. 10, 2006.

(Continued)

*Primary Examiner*—Kiley Stoner
(74) *Attorney, Agent, or Firm*—Carlson, Gaskey & Olds

(57) ABSTRACT

A method of repairing a braze joint and the resulting joint includes removing an unsuitable portion of a first joining material in a joint between a first member and a second member of an aerospace assembly and cleaning the joint. A stripping solution is used to remove the unsuitable portion of the first joining material. A first cleaning solution is used to clean the joint, and the joint is further cleaned using a second cleaning solution. During a rebrazing step, a second joining material moves into a void left by the removed unsuitable portion from the removal step to form a new joint between the first member and the second member that includes the remaining first joining material and the second joining material.

34 Claims, 1 Drawing Sheet

U.S. PATENT DOCUMENTS 6,719,892 B2    4/2004    Jaworowski
2007/0023142 A1*    2/2007    LaGraff et al. ........ 156/345.31

FOREIGN PATENT DOCUMENTS

| EP | 1 184 129 | 3/2002 |
|----|-----------|--------|
| EP | 1 312 437 | 5/2003 |
| JP | 02250727 | 10/1990 |
| JP | 10072687 | 3/1998 |

OTHER PUBLICATIONS

Cleaning Steel for Brazing (Chapter 11), Jun. 29, 2003, htp://www.carbideprocessors.com/Brazing/book/11.htm.

W. Daniel Kay, "Repair Brazing: Fixing Faulty Jobs and worn-out components," Jul. 26, 2002, Practical Welding Today.

Australian Search Report, mailed May 19, 2006.

* cited by examiner

REPAIR OF BRAZE JOINT AND ARTICLE REPAIRED

BACKGROUND OF THE INVENTION

The present invention relates to the repair of a braze joint and the repaired article, and more particularly to a method of repairing a braze joint of an article such as an aerospace component that includes removing a portion of a braze material in the braze joint and cleaning the braze joint.

Various aerospace assemblies include sub-assemblies secured together by a braze joint. In a gas turbine engine, a compressor stator assembly with one or more airfoil vanes secured to one or two shrouds is one example of such a braze article. The compressor stator assembly typically includes a braze joint having braze material connecting the airfoil vane to the shroud. During operation of the engine over time, the braze material may crack, erode, or experience other braze joint unsuitable conditions that may require repair.

Disadvantageously, conventional repair of the braze joint typically requires the complete removal of the original braze material (along with contaminants associated with the original braze joint). With the original braze material completely removed, the airfoil vane becomes separated from the shroud. The conventional removal process includes completely removing the braze material, corrosion products, oxidation products, and other contaminants through chemical and/or mechanical stripping processes, such as mechanical punching or electro-discharge machining. After completely removing the braze material and contamination, the joint area may be nickel plated then the airfoil vane and shroud are rebrazed using a new braze material. This type of conventional repair process may be expensive, laborious, and time-consuming.

Hence, there is a need for a simplified method of repairing aerospace assemblies that overcomes the shortcomings and drawbacks of the prior art.

SUMMARY OF THE INVENTION

The method of repairing a braze joint and the resulting joint according to the present invention includes removing an unsuitable portion of a first joining material in a joint between a first member and a second member of an aerospace assembly and cleaning the joint. A stripping solution is used to remove the unsuitable portion of the first joining material. A first cleaning solution is used to clean the joint, and a second cleaning solution is used to further clean the joint. During a rebrazing step, a second joining material moves into a void left by the removed unsuitable portion in the removal step to form a new joint between the first member and the second member that includes the first joining material and the second joining material.

In one example, the stripping solution is acidic and dissolves the unsuitable portion of the first joining material. Enough first joining material remains in the joint to maintain the structural connection between the first member and the second member such that the first member does not separate from the second member.

In another example, the first cleaning solution includes an alkali metal molten salt bath that cleans the joint by removing remaining stripping solution from the joint and dissolving contaminants in the joint.

In another example, the second cleaning solution is an acid solution that further cleans the joint by removing remaining first cleaning solution from the joint and dissolving contaminants from the joint.

In another example, a metal layer is deposited between the first joining material and the second joining material to promote wetting and flow of the second joining material during the rebrazing step.

The present invention therefore simplifies repair of an aerospace assembly by eliminating the need to completely disassemble the first member and second member to laboriously chemically and mechanically remove the joining material before the rebrazing step.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
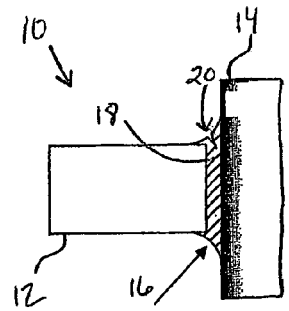
FIG. 1 illustrates a schematic cross-sectional view of an exemplary aerospace assembly.

FIG. 1 illustrates a schematic cross-sectional view of an exemplary article such as an aerospace assembly 10 utilized in a gas turbine engine. The aerospace assembly 10 includes a first member 12 that is secured to a second member 14 at a braze joint 16, although it is to be understood that additional members and additional braze joints may be included in the aerospace assembly 10. In one example, the aerospace assembly 10 is a stator assembly such as a compressor stator assembly and the first member 12 is a compressor shroud made of a nickel-based alloy, the second member 14 is a compressor stator airfoil vane made of a nickel-based alloy, and the braze joint 16 includes a nickel-based braze material. The terminology "braze" as used herein refers to a type of joining process performed above a nominal temperature of about 840° F., to a type of joining process wherein a joining material is liquefied and subsequently solidified to join two components without liquefying the two components, or to a type of joining process wherein at least two dissimilar materials are joined.

The braze joint 16 includes braze material 18 that provides a structural connection between the first member 12 and the second member 14 and may include an unsuitable section 20. Example unsuitable sections 20 could include cracks, voids, eroded portions, or other imperfections that may occur from field use of the aerospace assembly 10, from manufacturing, or from other sources. In one example unsuitable portion 20, the size of the unsuitable portion 20 ranges nominally from a microscopic size on the order of a couple of microns to a macroscopic size on the order of several centimeters.

Figure 2:
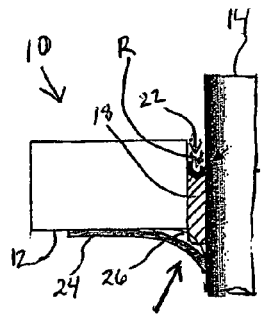
FIG. 2 illustrates an example schematic cross-sectional view of the aerospace assembly of FIG. 1 after removing an unsuitable portion.

FIG. 2 illustrates an example of the aerospace assembly 10 after removing the unsuitable portion 20 using a stripping solution. Removal of the unsuitable portion 20 leaves a void 22 where the unsuitable portion 20 formerly was located. Prior to using the stripping solution, a mask 24 is affixed to the stator assembly, including at least a portion 26 of the braze joint 16 that is not to be removed by the stripping solution. The mask 24 could also cover other portions of the stator assembly. In one example, the mask 24 covers the entire braze joint 16 except for the unsuitable section 20. This may provide the advantage of selectively removing the unsuitable section 20 without removing or otherwise affecting the braze material 18 of the portion 26. It is to be understood that in other examples, the mask may not be used, or may be used to cover additional braze joints in the aerospace assembly 10.

In another example, enough braze material 18 remains in the braze joint 16 after using the stripping solution to maintain the structural connection between the first member 12 and the second member 14 such that the first member does not separate from the second member 14. Maintaining the structural connection may provide an advantage of not having to completely separate, and subsequently completely reassemble, the first member 12 and the second member 14.

One example stripping solution is acidic and selectively dissolves the unsuitable portion 20 portion of the braze joint 16. That is, the stripping solution dissolves the braze material 18 without dissolving the material or materials that form the first member 12 and the second member 14. The exposure time of the aerospace assembly 10 and braze joint 16 to the stripping solution corresponds to the size of the unsuitable portion 20. An example exposure time is on the order of days for a microscopic crack. In another example, the exposure time is on the order of a couple of minutes for a macroscopic crack. Generally, it is more difficult for the stripping solution to penetrate small unsuitable portions 20 and, therefore, more time may be required for the stripping solution to dissolve the braze material 18 in a small unsuitable portion 20 and transport the dissolved braze material 18 away. Some residue R from the stripping process may remain in the void 22. In some examples, this residue R is removed by a water rinse or other removal method.

Figure 3:
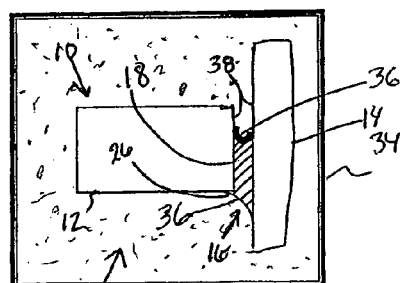
FIG. 3 illustrates one example of the aerospace assembly of FIG. 2 during a cleaning step.

FIG. 3 illustrates one example of the aerospace assembly 10 during a cleaning step. Prior to the cleaning step, the mask 24 is removed by burning from the portion 26 at approximately 900° F., although an acid solution or other conventional removal technique could alternatively be used. The aerospace assembly 10 is exposed, such as by immersion, rinsing, spraying or other method of exposure, to a cleaning solution 32 while inside of a chamber 34 at a predetermined cleaning temperature. During the cleaning step, the cleaning solution 32 removes at least a portion of any remaining stripping solution, at least some contaminants from the braze joint 16, and residue R that may remain in the braze joint 16. Example contaminants include oxides, metal oxides, corrosion products, inorganic materials, materials deposited on the aerospace assembly 10 during field operation, and contaminants that inhibit flow and wetting of a braze material during a subsequent rebrazing process.

The cleaning step may provide the advantage of yielding clean surfaces on the aerospace assembly 10. That is, the cleaning step removes contamination from exposed surfaces 36 of the braze material 18 and exposed surfaces 38 of the first member 12 and second member 14. Clean and essentially contaminant-free surfaces 36 and 38 may promote formation of a quality braze joint between the first member 12 and second member 14 in a subsequent rebrazing process.

The terminology "quality" braze joint as used herein refers to a braze joint having a braze material that is generally free of major unsuitable portions, such as macrovoids.

In one example, the cleaning step occurs in the chamber 34 at a predetermined cleaning temperature range of between approximately 775° F. to 950° F. In the predetermined cleaning temperature range, the cleaning solution dissolves the contaminants, thereby removing the contaminants from the braze joint 16. In other examples, a selected cleaning temperature in the predetermined cleaning temperature range corresponds to a cleaning exposure time of the aerospace assembly 10 to the cleaning solution 32. That is, a selected cleaning temperature near 775° F. may require several hours or even days to clean the braze joint 16 and a selected cleaning time near 950° F. may require several minutes or even seconds to clean the braze joint 16. In one example, the selected cleaning temperature is about 800° F. and the cleaning exposure time is between five and ten minutes to remove an adequate amount of contamination from the braze joint 16 such that a quality braze joint is formed between the first member 12 and the second member 14 in a subsequent rebrazing process.

One example cleaning solution 32 includes an alkali metal molten salt bath. The molten salt bath includes the alkali metal as the primary constituent, however, in other examples the cleaning solution 32 includes modifying chemicals and/or other salts in addition to the alkali metal. Preferably, the alkali metal of the cleaning solution 32 is alkali hydroxide or alkali nitrate, although other alkali metal cleaning solutions can be used. The alkali metal cleaning solution 32 may clean the braze joint 16 in two respects. First, the alkali metal cleaning solution 32 dissolves the contaminants in the braze joint 16 and transports the dissolved contaminants away from the braze joint 16. Second, the alkali metal cleaning solution 32 also may neutralize and transport away any acidic stripping solution that remains in the braze joint 16 to thereby prevent the acidic stripping solution from removing additional braze material 18 or impeding removal of the contaminants.

In other examples, additional steps of rinsing and quenching the aerospace assembly 10 accompany the cleaning step. Rinsing the aerospace assembly 10 with cold water removes at least a portion of the cleaning solution 32 and dissolved contamination from the braze joint 16 and cools the aerospace assembly 10.

Figure 4:
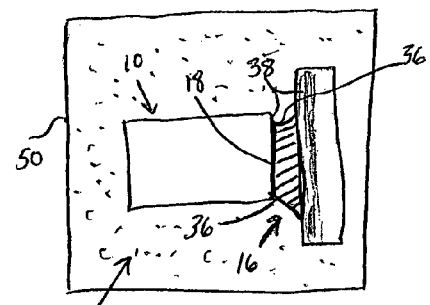
FIG. 4 illustrates one example of the aerospace assembly of FIG. 3 during a second cleaning step.

FIG. 4 illustrates one example of the aerospace assembly 10 during a second cleaning step. The aerospace assembly 10 is exposed, such as by immersion, rinsing, spraying or other method of exposure, to a second cleaning solution 48 while inside of a chamber 50 at a predetermined second cleaning temperature. During the second cleaning step, the second cleaning solution 48 removes the remaining first cleaning solution 32 and byproducts from the first cleaning step as well as contaminants that remain from the first cleaning step. Thus, the second cleaning step further cleans the surfaces on the aerospace assembly 10. That is, the second cleaning step further removes contamination from exposed surfaces 36 and 38 and promotes formation of a quality braze joint between the first member 12 and second member 14 in a subsequent rebrazing process.

In one example, the second cleaning step occurs in the chamber 50 at a predetermined second cleaning temperature of between approximately room temperature (60° F.) and up to 212° F. At the predetermined second cleaning temperature, the second cleaning solution dissolves the contaminants, thereby removing the contaminants from the braze joint 16. In some examples, a selected second cleaning temperature in the predetermined second cleaning temperature range corresponds to a cleaning exposure time of the aerospace assembly 10 to the second cleaning solution 48. That is, a selected second cleaning temperature near ambient room temperature may require several hours to clean the braze joint 16 and a selected cleaning exposure temperature near 212° F. may require several minutes or even seconds to clean the braze joint 16. In one example, the selected second cleaning temperature is between 60° F. and 90° F. and the second cleaning exposure time is between three and five minutes to remove additional contamination from the braze joint 16 such that a quality braze joint is formed between the first member 12 and the second member 14 in a subsequent rebrazing process.

One example second cleaning solution 48 includes an acid solution having a combination of nitric acid, hydrofluoric acid, and water. However, in other examples the second cleaning solution 48 includes a single type of acid, other acids, and/or modifying chemicals. Preferably, the second cleaning solution 48 includes between 28 vol % and 50 vol % of nitric acid, between 1.5 vol % and 5.1 vol % of hydrofluoric acid, and the balance water. The hydrofluoric acid is added to the second cleaning solution 48 as received from a supplier and is nominally between about a 49% and 70% concentration, however, other concentrations may be obtained and the amount of hydrofluoric acid in the second cleaning solution may be recalculated accordingly. The combination of several different acids may provide the benefit of dissolving and removing most of the remaining contamination in the braze joint 16 and/or dissolving and removing a variety of types of contamination in the braze joint 16. In one example, the second cleaning solution 48 includes about 40 vol % of nitric acid, between about 2.0 vol % and 3.0 vol % hydrofluoric acid, and the balance water.

Another exemplary second cleaning solution 48 for removing remaining cleaning solution 32 and byproducts from the first cleaning step as well as contaminants that remain from the first cleaning step includes ferric chloride. The second cleaning solution 48 is prepared according to a bulk recipe per 100 gallons of second cleaning solution 48. The bulk recipe includes up to 2.5 gallons of nitric acid, up to 83 gallons of hydrofluoric acid, between 130 pounds and 140 pounds of anhydrous ferric chloride, and the balance water.

In other examples, additional steps of rinsing and drying the aerospace assembly 10 accompanies the second cleaning step. Rinsing the aerospace assembly 10 with water removes at least a portion of the second cleaning solution 48 and dissolved contamination from the braze joint 16. Drying includes spraying the aerospace assembly 10 with compressed air to remove at least some remaining rinse water. The aerospace assembly 10 can be further dried in an air-dry process to ready the aerospace assembly 10 for a next step.

Figure 6:
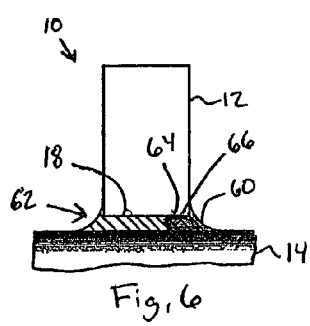
FIG. 6 illustrates one example of the aerospace assembly of FIG. 5 after the rebrazing step.
Figure 5:
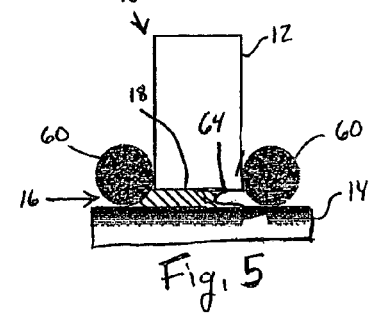
FIG. 5 illustrates one example of the aerospace assembly of FIG. 4 during a rebrazing step.

FIG. 5 illustrates one example of the aerospace assembly 10 during a rebrazing step. In the rebrazing step, a second braze material 60 is positioned adjacent to the braze joint 16. The second braze material 60 includes a composition that is essentially equal to the composition of the braze material 18, however, the second braze material 60 can alternatively include a composition that is different than the braze material 18. The aerospace assembly 10, braze joint 16, and second braze material 60 are heated to a brazing temperature to liquefy the second braze material and move the second braze material 60 into the void 22 that was previously formed by the removal of the unsuitable portion 20, as illustrated in FIG. 6. The aerospace assembly 10 is then cooled to solidify the second braze material 60 and form a new braze joint 62 that includes the braze material 18 and second braze material 60. The braze material 18 and second braze material 60 join the first member 12 and second member 14.

In one example, the second braze material 60 wets surfaces 64 of the void 22, flows into the void 22, and completely fills the void 22. The previous cleaning step and second cleaning step advantageously removed at least a portion of the contaminants that may have otherwise inhibited the second braze material 60 from wetting the surface 64 and flowing into the void 22 to completely fill the void 22. The resulting new braze joint 62 is generally free of major unsuitable portions, such as macrovoids.

Figure 7:
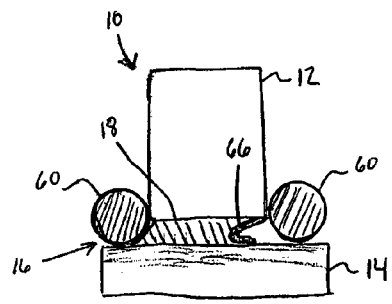
FIG. 7 illustrates an example a metal layer deposited between the braze material and the second braze material.

Alternatively, a metal layer 66 may be deposited between the braze material 18 and the second braze material 60 prior to the rebrazing step, as illustrated in FIG. 7. The metal layer 66 further promotes wetting and flow of the second braze material 60 into the void 22 during the rebrazing step. An example metal layer 66 includes nickel and is deposited by a known process, such as a plating process. It is to be understood that other metals layers deposited using other deposition processes may also be used.

The present invention therefore simplifies the repair of the aerospace assembly 10 by eliminating the need to completely disassemble the first member 12 and second member 14 to laboriously chemically and mechanically remove the braze material 18 before the rebrazing step.

It should be understood that although a particular component arrangement is disclosed in the illustrated embodiments, other arrangements will benefit from the instant invention.

Although particular step sequences are shown, described, and claimed, it should be understood that steps may be performed in any order, separated or combined unless otherwise indicated and will still benefit from the present invention.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of repairing a joint of an aerospace component comprising: (a) removing an unsuitable portion of a joining material from the joint by dissolving at least the unsuitable portion of joining material using an acidic stripping solution; (b) cleaning a remaining portion of the joining material in the joint for predetermined amount of time using an alkali metal molten salt bath; and (c) forming a suitable portion in replacement of the unsuitable portion to repair the joint.

2. The method of claim 1, wherein the joint is a braze joint.

3. The method of claim 1, wherein the aerospace component is a stator assembly having at least one airfoil vane and at least one shroud, and the joining material is a nickel-based braze material.

4. The method of claim 1, including masking at least a suitable portion of the braze joint to prevent the suitable portion from dissolving and leaving the unsuitable portion unmasked.

5. The method of claim 1, wherein the remaining portion of the joining material provides a structural connection between at least two members of the joint.

6. The method of claim 1, wherein step (b) includes cleaning at a temperature between approximately 775° F. and 950° F.

7. The method of claim 6, wherein step (b) includes cleaning at a temperature of about 800° F.

8. The method of claim 1, wherein step (b) includes removing contamination from the joint using the alkali metal molten salt bath as a cleaning solution for a predetermined amount of time.

9. The method of claim 8, wherein the contamination includes the stripping solution used in the removing of step (a).

10. The method of claim 8, wherein the predetermined amount of time is up to 2 hours.

11. The method of claim 10, wherein the predetermined amount of time is between 5 and 10 minutes.

12. The method of claim 8, wherein the contamination includes an oxide and the removing includes dissolving the oxide.

13. The method of claim 8, wherein the alkali metal molten salt bath comprises an alkali hydroxide as the cleaning solution.

14. The method of claim 8, wherein the alkali metal molten salt bath comprises an alkali nitrate as the cleaning solution.

15. The method of claim 8, including removing at least one of a byproduct of the cleaning solution or a contaminant from the aerospace joint using a second cleaning solution.

16. The method of claim 15, wherein the second cleaning solution using step occurs for a predetermined amount of time of up to 2 hours at a predetermined temperature up to 212° F.

17. The method of claim 16, wherein the predetermined amount of time is between 3 and 5 minutes.

18. The method of claim 16, wherein the predetermined temperature is between 60° F. and 90° F.

19. The method of claim 15, including providing at least one type of acid in the second cleaning solution and dissolving at least one of the byproduct or the contaminant.

20. The method of claim 19, including providing nitric acid in the second cleaning solution.

21. The method of claim 20, including providing about 28 vol % to 50 vol % of nitric acid.

22. The method of claim 21, including providing about 40 vol % of nitric acid.

23. The method of claim 19, including providing hydrofluoric acid in the second cleaning solution.

24. The method of claim 23, including providing about 1.5 vol % to 5.1 vol % of hydrofluoric acid.

25. The method of claim 24, including providing about 2.0 vol % to 3.0 vol % of hydrofluoric acid.

26. The method of claim 19, including providing between 28 vol % and 50 vol % of nitric acid, between 1.5 vol % and 5.1 vol % of hydrofluoric acid, and water as the second cleaning solution.

27. The method of claim 19, including providing per 100 gallons of the second cleaning solution, up to 2.5 gallons of nitric acid, up to 83 gallons of hydrochloric acid, between about 130 and 140 pounds of anhydrous ferric chloride, and the balance water.

28. The method of claim 1, including depositing a second joining material in the joint and heating the second joining material to move the second joining material into a void left from removing the portion of the joining material in step (a).

29. The method of claim 1, including depositing a metal layer over the remaining joining material.

30. A method of repairing an article having a braze joint, comprising the steps of: removing an unsuitable section of said braze joint by dissolving at least the unsuitable section of said braze joint using an acidic stripping solution; cleaning a remaining portion of said braze joint for a predetermined amount of time using a molten salt bath that comprises an alkali metal cleaning solution; and brazing said article to replace said unsuitable section with a suitable section; wherein said unsuitable section is less than all of said braze joint.

31. The method of claim 30, including selectively removing the unsuitable section of the braze joint without removing any other section of the braze joint.

32. The method of claim 31, including masking the other section to prevent removal of the other section.

33. The method of claim 32, wherein the other section includes at least one of a second braze joint or a braze joint portion that does not include an unsuitable section.

34. The method of claim 30, wherein the braze joint maintains a structural connection after the unsuitable section is removed.

* * * * *

UNITED STATES PATENT AND TRADEMARK OFFICE
CERTIFICATE OF CORRECTION

PATENT NO. : 7,303,112 B2 Page 1 of 1
APPLICATION NO. : 10/977853
DATED : December 4, 2007
INVENTOR(S) : Ivory et al.

It is certified that error appears in the above-identified patent and that said Letters Patent is hereby corrected as shown below:

Claim 1, Column 6, line 49: insert --the-- after "of" and before "joining"

Claim 1, Column 6, line 50: insert --a-- after "for" and before "predetermined"

Signed and Sealed this

Twenty Second Day of April, 2008

JON W. DUDAS
*Director of the United States Patent and Trademark Office*